United States Patent
Prasad et al.

(10) Patent No.: US 10,095,556 B2
(45) Date of Patent: Oct. 9, 2018

(54) PARALLEL PRIORITY QUEUE UTILIZING PARALLEL HEAP ON MANY-CORE PROCESSORS FOR ACCELERATING PRIORITY-QUEUE-BASED APPLICATIONS

(71) Applicant: Georgia State University Research Foundation, Inc., Atlanta, GA (US)

(72) Inventors: Sushil K. Prasad, Suwanee, GA (US); Xi He, Atlanta, GA (US); Dinesh Agarwal, Atlanta, GA (US)

(73) Assignee: Georgia State University Research Foundation, Inc., Atlanta, GA (US)

( * ) Notice: Subject to any disclaimer, the term of this patent is extended or adjusted under 35 U.S.C. 154(b) by 14 days.

(21) Appl. No.: 14/653,569

(22) PCT Filed: Dec. 19, 2013

(86) PCT No.: PCT/US2013/076640
§ 371 (c)(1),
(2) Date: Jun. 18, 2015

(87) PCT Pub. No.: WO2014/100452
PCT Pub. Date: Jun. 26, 2014

(65) Prior Publication Data
US 2015/0309846 A1   Oct. 29, 2015

Related U.S. Application Data

(60) Provisional application No. 61/740,343, filed on Dec. 20, 2012.

(51) Int. Cl.
*G06F 9/38* (2018.01)
*G06F 9/52* (2006.01)
(Continued)

(52) U.S. Cl.
CPC ............... *G06F 9/522* (2013.01); *G06F 7/24* (2013.01); *G06F 9/4881* (2013.01); *G06F 9/545* (2013.01); *G06F 9/546* (2013.01); *G06T 1/20* (2013.01); *G06F 9/3887* (2013.01); *G06F 12/00* (2013.01); *G06F 2209/548* (2013.01)

(58) Field of Classification Search
CPC ......... G06F 9/3887; G06F 12/00; G06F 9/522
See application file for complete search history.

(56) References Cited

U.S. PATENT DOCUMENTS

2008/0187053 A1   8/2008   Zhao et al.
2010/0180057 A1   7/2010   Navarro et al.
(Continued)

OTHER PUBLICATIONS

Steinberger et al., "ScatterAlloc: Massively Parallel Dynamic Memory Allocation for the GPU", May 14, 2012, Proceedings of Innovative Parallel Computing (InPar'12), 2012, pp. 1-10.*
(Continued)

*Primary Examiner* — Matthew Salvucci
(74) *Attorney, Agent, or Firm* — Thomas | Horstemeyer, LLP

(57) ABSTRACT

Disclosed are various embodiments for a parallel priority queue implemented on one or more many-core processors and/or multi-core processors such as those in general-purpose graphics processing units (GPGPUs). According to various embodiments, a priority may be determined according to a timestamp of an item, such as an event or an entry, in a priority queue. A priority queue interface may comprise functions to insert and remove entries from the priority queue. Priority order of the entries may be maintained as the entries are inserted and removed from the queue.

20 Claims, 14 Drawing Sheets

(51) Int. Cl.
*G06F 12/00* (2006.01)
*G06F 9/54* (2006.01)
*G06F 7/24* (2006.01)
*G06F 9/48* (2006.01)
*G06T 1/20* (2006.01)

(56) References Cited

U.S. PATENT DOCUMENTS

2012/0159498 A1   6/2012  Wilmarth
2013/0198479 A1*  8/2013  Jones ................. G06F 12/0223
                                                         711/170

OTHER PUBLICATIONS

Deo, N. et al.: 'Parallel Heap: An Optimal Parallel Priority Queue.' The Journal of Supercomputing. vol. 6, No. 1, 1992, ISSN 0920-8542 pp. 87-98.
Park. H. et al.: 'A GPU-Based Application Framework Supporting Fast Discrete-Event Simulation.' Simulation. vol. 86, No. 10, Oct. 2010, ISSN 0037-5497 pp. 613-628.
International Search Report for PCT/US2013/076640 dated Mar. 31, 2014.
Che, S. et al.: 'A Performance Study of General-Purpose Applications on Graphics Processors Using CUDA.' Journal of Parallel Distributed Computing. vol. 68, No. 10, Oct. 2008, ISSN 0037-5497 pp. 1370-1380.
Narsingh Deo et al: "Parallel Heap: An Optimal Parallel Priority Queue", Journal of Supercomputing, Kluwer Academic Publishers, Dordrecht, NL, vol. 6, No. 1, Mar. 1, 1992 (Mar. 1, 1992), pp. 87-98, XP000298258, ISSN: 0920-8542, DOI: 10.1007/BF00128644.
Canadian Office Action for PCT/2013076640 dated Jun. 6, 2017.
Australian Examination Report No. 1, dated Aug. 16, 2018.

* cited by examiner

PARALLEL PRIORITY QUEUE UTILIZING PARALLEL HEAP ON MANY-CORE PROCESSORS FOR ACCELERATING PRIORITY-QUEUE-BASED APPLICATIONS

CROSS-REFERENCE TO RELATED APPLICATIONS

This application is the 35 U.S.C. § 371 national stage application of PCT Application No. PCT/US2013/076640, filed Dec. 19, 2013, which claims priority to and the benefit of, U.S. Provisional Patent Application No. 61/740,343, entitled "PARALLEL PRIORITY QUEUE ON MULTI-CORE PROCESSORS" filed on Dec. 20, 2012, both of which are hereby incorporated by reference in their entirety.

BACKGROUND

A priority queue is a data structure that exposes a programmatic interface to retrieve queue entries or items from the priority queue according to a priority. For example, in a priority queue, entries or items within the priority queue that have a high priority may be processed or otherwise served before items with a lower priority.

A multi-core processor is a component in a computing environment with two or more independent central processing units (known as "CPUs" or "cores"), which are the units that read and execute program instructions, for example, in association with an application. Many-core processors and massively multi-core processors comprise, for example, multi-core architectures having an atypically high number of cores. For example, various many-core processors and massively multi-core processors have tens or hundreds of cores.

With the emergence of general-purpose graphics processing units (GPGPUs), powerful computing platforms are readily available to scientists and engineers. However, without the support of an efficient parallel priority queue, a significant class of related applications is not able to run on GPGPUs. Considering the nature of single instruction, multiple thread (SIMT) architecture, as well as the inefficient implementation of locks, developing an efficient parallel priority queue on GPGPUs has been an outstanding challenge.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
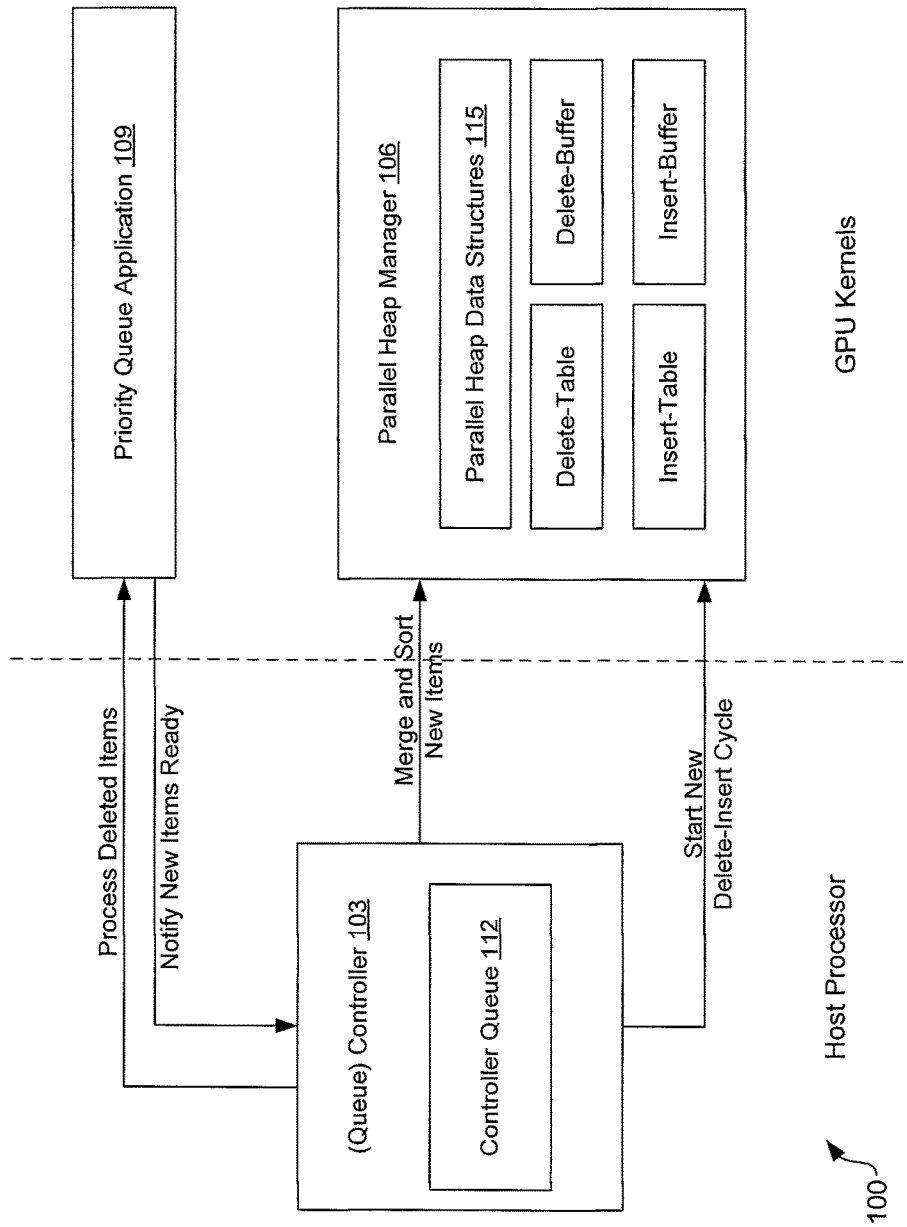
FIG. 1 is a drawing of a computing environment according to various embodiments of the present disclosure.

The present disclosure relates to priority-based processing of data on various architectures. A priority queue is a data structure that exposes a programmatic interface for retrieving queue entries or items from the priority queue according to a priority. Priority queues are employed in computing applications to or order tasks on a priority basis, such as a first-come, first-serve basis. For example, in a priority queue, entries or items within the priority queue that have a high priority may be processed or otherwise served before items with a lower priority. "Heaps" are underlying data structures of a priority queue that may be described as a tree-based data structure.

A multi-core processor is a component in a computing environment with two or more independent central processing units (known as "CPUs" or "cores"), which are the units that read and execute program instructions, for example, in association with an application. Many-core processors and massively multi-core processors comprise, for example, multi-core architectures having an atypically high number of cores. For example, various many-core processors and massively multi-core processors have tens or hundreds of cores.

With the emergence of general-purpose graphics processing units (GPGPUs), powerful computing platforms are readily available to scientists and engineers having many-core and multi-core architectures. However, without the support of an efficient parallel priority queue, a significant class of applications is not able to execute on GPGPUs. Considering the nature of SIMT architectures, as well as the inefficient implementation of locks, developing an efficient parallel priority queue on GPGPUs has been an outstanding challenge.

Accordingly, described herein are various embodiments of a parallel priority queue implemented on one or more many-core processors and/or multi-core processors such as those in general-purpose graphics processing units (GPGPUs). According to various embodiments, a priority may be determined according to a timestamp of an item, such as an event or an entry, in a priority queue. A priority queue interface may comprise functions to insert and remove entries from the priority queue. Priority order of the entries may be maintained as the entries are inserted and removed from the queue.

According to various embodiments, a priority queue may be employed as a parallel heap, as will be described in greater detail below, to act as an efficient parallel priority queue used in the parallelization of important non-numeric irregular computations such as discrete event simulation (e.g., event simulation for transportation, telecommunication, very-large-scale integration (VLSI) and biological networks, agent-based simulations, market simulations, etc.), multi-processor scheduling, branch-and-bound algorithms, various other state space search algorithms, and/or other irregular computations. In various embodiments disclosed herein, a priority queue is implemented as a parallel heap so that the retrieval, insert, and removal operations on the priority queue are performed in parallel. For example, a parallel heap with a node capacity of r≥1 may comprise a complete binary tree such that each node (with the exception of the last node) contains r sorted keys, wherein all r keys at a node have values less than or equal to the keys at its children. Since there are r keys in a single heap node, the insert and delete operations over these keys can be aggregated and processed together in batches in a pipelined fashion, as will be described in greater detail below. In the following discussion, a general description of a parallel heap system and its components is provided, followed by a discussion of the operation of the same.

FIG. 1 is a drawing of a computing environment 100 according to various embodiments of the present disclosure. According to various embodiments, a parallel heap system implemented in a computing environment 100 may comprise, for example, a controller 103, a parallel heap manager 106, and a priority queue application 109, as shown in FIG. 1. The controller 103 is located on the CPU (central processing unit) side while the parallel heap manager 106 and the priority queue application 109 are on the GPU side. The controller 103 acts as a mediator between the parallel heap manager 106 and the priority queue application 109, and is configured to control the execution of the parallel heap system as well as maintain a controller queue 112. The parallel heap data structures 115 reside in device memory, and a set of kernel functions implement the interfaces of a priority queue and maintain the parallel heap data structures 115. The priority queue application 109 notifies the controller 103 when its output data, the set of newly-produced insert items, is ready. Next, the priority queue application 109 is configured to suspend itself and wait for input data, the set of highest priority items to be deleted from the parallel heap. The controller 103 sends a request to the parallel heap manager 106 to merge the new items from the priority queue application 109 with items at the heap's root node, to sort them and to return the r smallest items to the priority queue application 109. Once complete, the controller 103 informs the priority queue application 109 to resume with the r smallest data items from the parallel heap manager 106 and, at the same time, requests the parallel heap manager 106 to launch a new delete-insert cycle to maintain the parallel heap. The above process may be repeated until the priority queue application 109 is completed.

In various embodiments disclosed herein, insert and removal operations on the parallel heap corresponding to the priority queue are performed by a multi-core processor or a many-core processor such as a general-purpose graphics processing unit (GPGPU). Synchronization of the parallel heap operations is achieved by various barriers on the many-core processor. For example, insert operations and delete operations for a parallel heap may be performed as a series of delete-insert cycles, wherein each delete-insert cycle handles an insertion of k new keys as well as a deletion of r keys with a highest priority, wherein $$k \leq 2r \quad \text{(eq. 1)}.$$

As may be appreciated, the constant 2 in eq. 1 can be set to another constant without loss of generality. The steps of execution in each delete-insert cycle may be described as follows. First, the k new keys may be sorted and merged with the r keys at the root node. The first r sorted keys for the parallel heap application are deleted, and the keys at the root node are substituted with the second r keys. The remaining keys are used to initiate a new insert-update process in the next step. Second, a new delete-update and insert-update process is initiated starting at the root node. Simultaneously, the delete-update and insert-update processes are processed at the even level of the parallel heap.

Third, the delete-update and insert-update processes may are processed at the odd-level of the parallel heap. In the first step, k new keys are inputted into the parallel heap. If k is equal to and less than r, then no insert-update process will be initiated in the second step. Particularly, when k is less than r, (r−k) keys are retrieved from the end of the parallel heap or from an insert-update process heading towards the last node. If k is more than r and the last node does not have enough space to hold (k−r) keys, then two insert-update processes in the second step are launched to insert the keys into two distinct heap nodes. Otherwise, only one insert-update may be needed. As the second r keys are placed at the root node, a property of the heap may be destroyed.

As a result, a delete-update process is initiated by merging the keys at the root node with those at its children. The smallest r keys are kept at the root node while the second r smallest keys are placed at the left child node if its largest key is bigger than that of the right child node. Otherwise, the second r smallest keys are placed at the right child node. Finally, the largest r keys are placed at the other child node. With such a placement, only the child node placed with the largest r keys might destroy the property of the heap, thus the delete-update process may continue on this node. The delete-update process may repeat until it goes to the bottom of the heap or if the parallel heap property is satisfied midway. Similarly, an insert-update process starts at the root node and "sinks" toward a target node at the bottom of the parallel heap after being repeatedly merged with the keys at the intervening nodes by carrying down the larger keys each time. In the first step and the second steps of the delete-insert cycle, as described above, each delete-update or insert-update process is moved down two levels in a parallel heap, thus multiple delete-update and insert-update processes coexist in the parallel heap and are carried out in a pipelined fashion for overall optimality.

Figure 2:
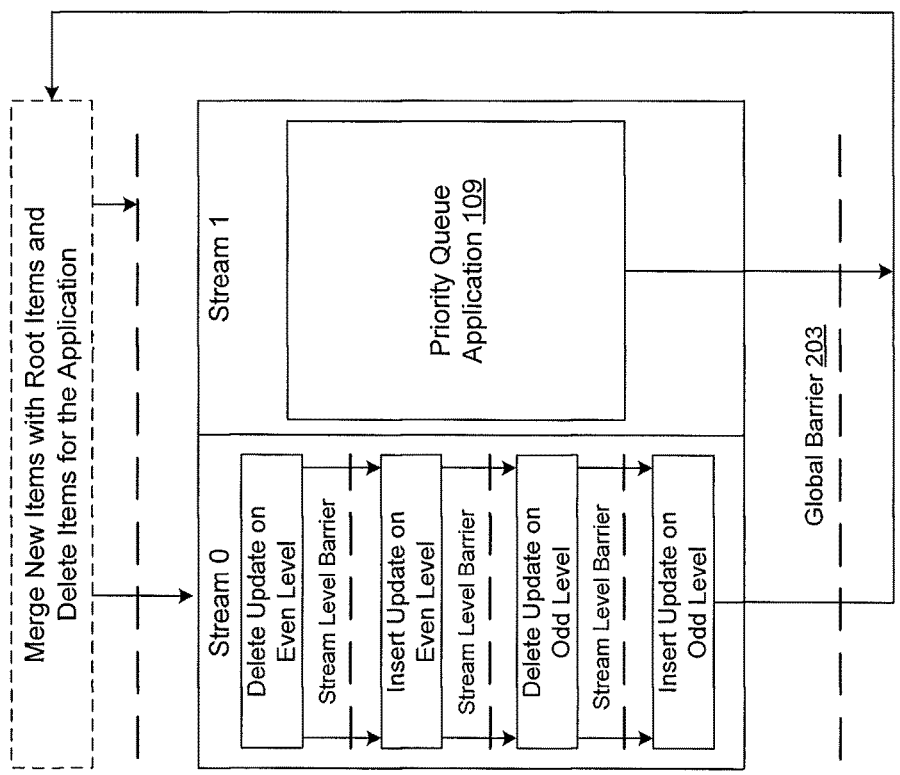
FIG. 2 is a flowchart illustrating one example of functionality implemented as portions of a parallel heap system executed in the computing environment of FIG. 1 according to various embodiments of the present disclosure.

Moving on to FIG. 2, shown is a flowchart illustrating one example of functionality implemented as portions of a parallel heap system executed in the computing environment of FIG. 1 according to various embodiments of the present disclosure. In the non-limiting example of FIG. 2, after the merging of the new items with the items at the root and the deletions of the smallest r items performed by the parallel heap manager 106 (FIG. 1), the controller 103 (FIG. 1) may need to synchronize both the parallel heap manager 106 and the priority queue application 109 with a global barrier 203 and initiate a new delete-insert cycle in the parallel heap manager 106 and resume the priority queue application 109.

A concurrent kernel feature of compute unified device architecture (CUDA)-enabled GPGPUs makes it possible to execute the parallel heap manager 106 and the priority queue application 109 concurrently by extracting additional parallelism for the parallel heap system. The kernel functions of the parallel heap manager 106 and those of the priority queue application 109 are assigned to distinct CUDA streams, with the kernel functions within a stream being executed in an order, such as a first-in-first-out (FIFO) arrangement. The insert and delete operations in each delete-insert cycle of a parallel heap is implemented as a set of kernel functions with the kernel calls acting as stream-level barriers to enforce the pipelined update of the parallel heap.

An important design consideration for CUDA programs is the data parallel SIMT architecture of the GPGPUs. SIMT architectures require that all threads within a warp execute the same instruction in any clock, and therefore the conditional branches are not preferred in CUDA programs. For example, in an if-then-else construct, if some threads in a warp take the then path and some the else path, two passes are needed for the execution of the construct, i.e., a first pass will be used to execute all threads that take the then path and a second pass will be used to execute the others. In the implementation of the parallel heap manager 106, however, a number of special cases such as the delete-update process of the last partially-filled heap node, the earlier terminated delete-update processes, etc., may be considered. The kernel function may be full of conditional branches and its performance may suffer in the event the special cases are dealt with in one kernel function. Accordingly, it is beneficial to have separate kernel functions implemented for each of these special cases and the controller 103 determines which kernel functions should be executed in accordance with the current status of the parallel heap.

To allow the controller 103 to better collaborate with the parallel heap manager 106, maintaining the status of the parallel heap within the controller 103 is beneficial even though parallel heap data structures 115 are stored in device memory. In each iteration, the number of new items produced can dynamically change the state of the heap, such as the total number of heap nodes and the number of levels in the heap. To maintain this critical information that many kernel calls rely on, a queue data structure is employed by the controller 103 to keep track of these changes. By pushing the number of new items in each iteration into the queue and popping the number of items as delete-update and insert-update processes are completed, the current status of the parallel heap is computed and maintained in the controller 103.

According to various embodiments, the parallel priority queue may be implemented on a GPU or a general purpose GPU (GPGPU). A GPU or GPGPU includes of an array of parallel processors which are often referred to as streaming multiprocessors (SM). For example, in a 480 GTX chip, manufactured by NVIDIA®, a single SM comprises thirty-two scalar processors with each scalar processor having a predefined number of registers. Each SM further comprises an amount of on-chip memory which has lower access latency and higher bandwidth compared to the global memory which is accessible to every SM, and has a larger size. The SMs employ a SIMT architecture. A minimum execution unit may comprise a warp (i.e., a group of 32 threads). Once scheduled on a SM, the threads in a warp share the same instruction and can execute in a synchronous fashion.

According to various embodiments, a plurality of parallel priority queues are implemented using CUDA, wherein CUDA is a computing architecture developed for parallel processing that enables programmers to access instruction sets and memory in GPGPUs. To this end, various programming languages may be employed, such as Open Computing Language (openCL). A typical CUDA program is organized into a plurality of host programs and one or more parallel kernel programs. The host programs may be executed on the host processor (also called a CPU) while the parallel kernel programs execute on the GPUs or GPGPUs.

Figure 3:
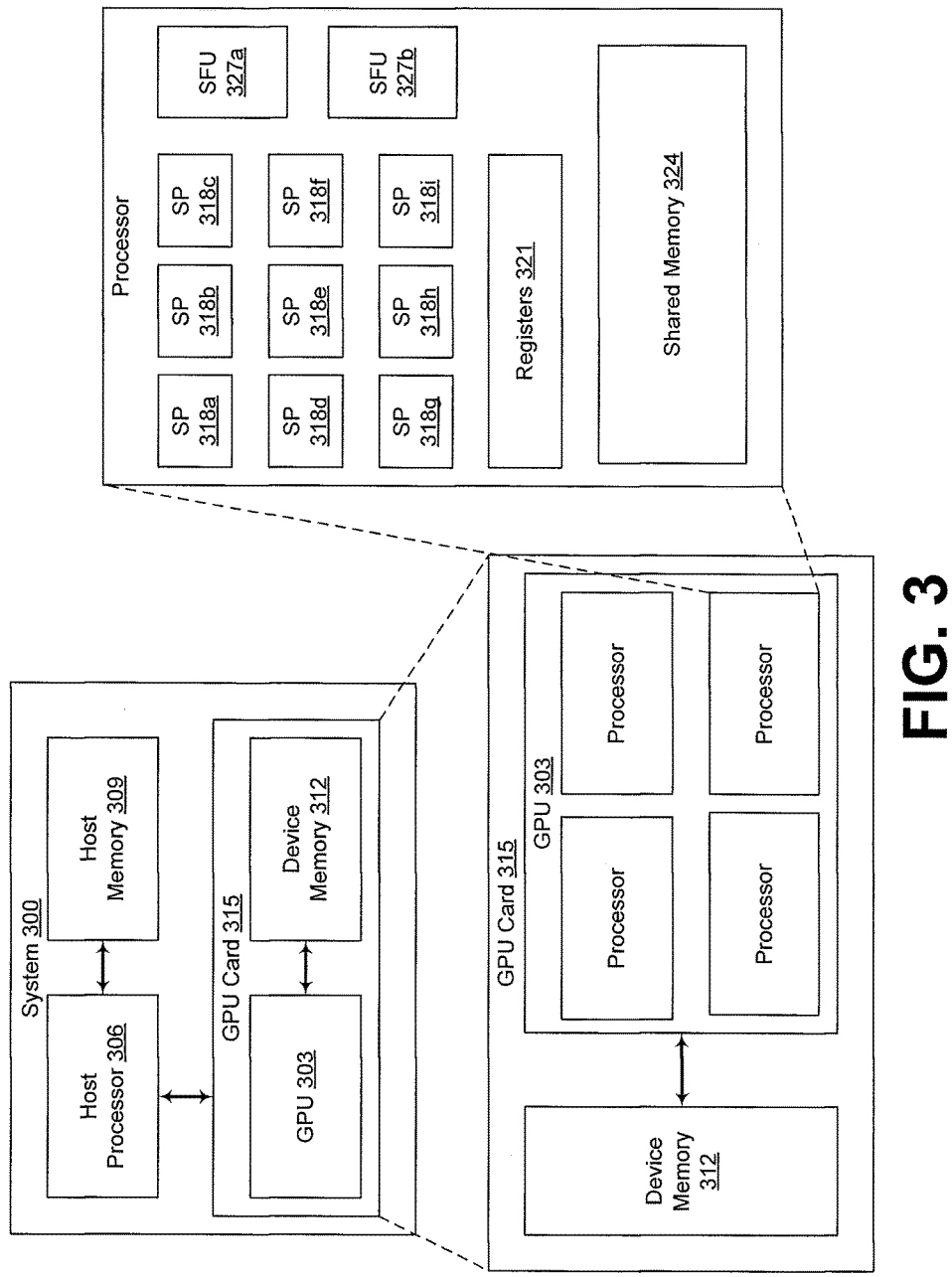
FIG. 3 is a drawing of an exemplary parallel heap system according to various embodiments of the present disclosure.

FIG. 3 shows an example of a system 300 that can be used to implement the parallel priority queue. The system 300 may comprise, for example, a GPU 303 and a host processor 306. The host processor 306 has access to host memory 309 while the GPU 303 has access to device memory 312. The GPU 303 and the device memory 312 may reside, for example, on a graphics card or a GPU card 315.

According to the non-limiting example of FIG. 3, the GPU 303 comprises a plurality of streaming multiprocessors (SMs) and may comprise a local cache. Each SM in turn includes a plurality of streaming processors (SPs) 318a . . . 318i which may employ a SIMT architecture. A SP may further comprise a plurality of registers 321 and shared memory 324, and may include special functional units (SFUs) 327a-b. The parallel priority may also be implemented as a collection of parallel heaps, with one or more parallel heaps per SM to allow faster synchronizations within an SM, and can suffice for those priority queue applications where local prioritizations are sufficient. For global prioritization, the controller 103 (FIG. 1) coordinates across all parallel heaps and the application.

Figure 4A:
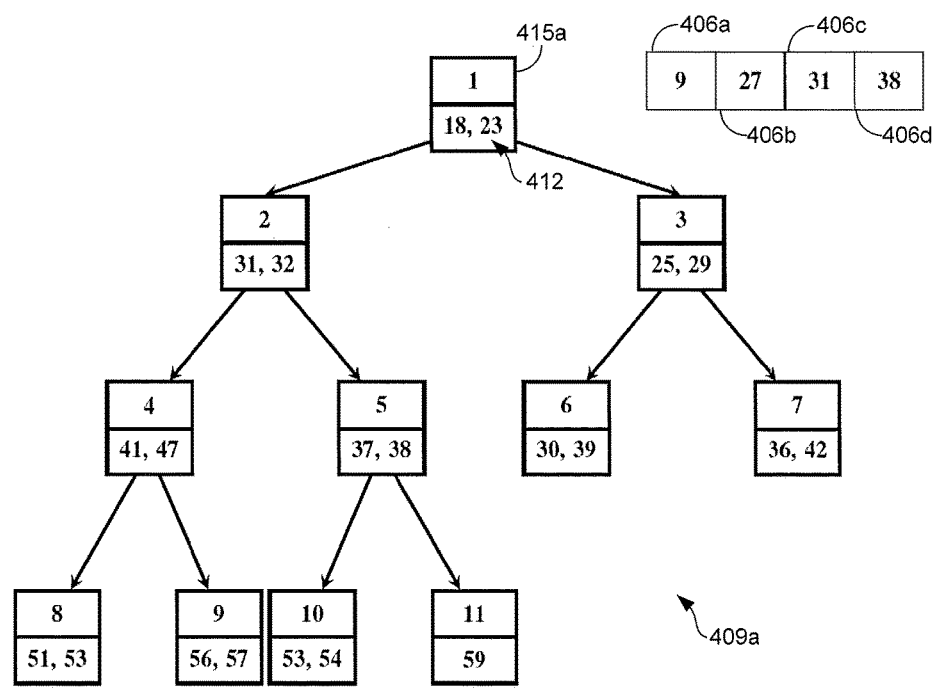
FIGS. 4A, 4B, 4C, 5, and 6 are diagrams illustrating example operations of a parallel heap implemented as portions of the priority queue application executed in a computing environment in the computing environment of FIG. 1 according to various embodiments of the present disclosure.
Figure 4B:
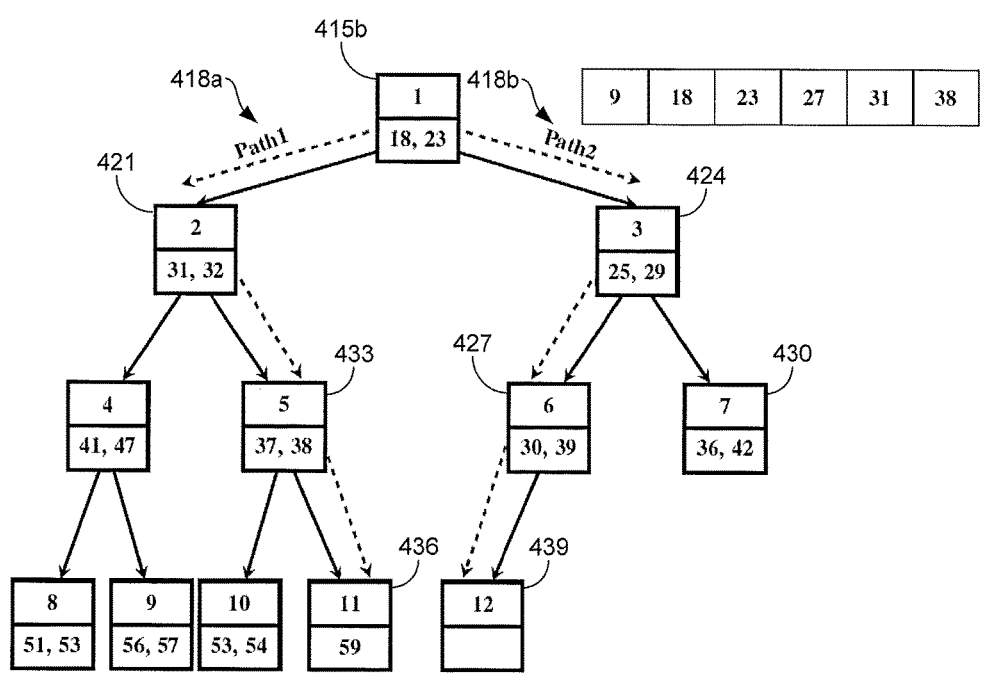
Figure 4C:
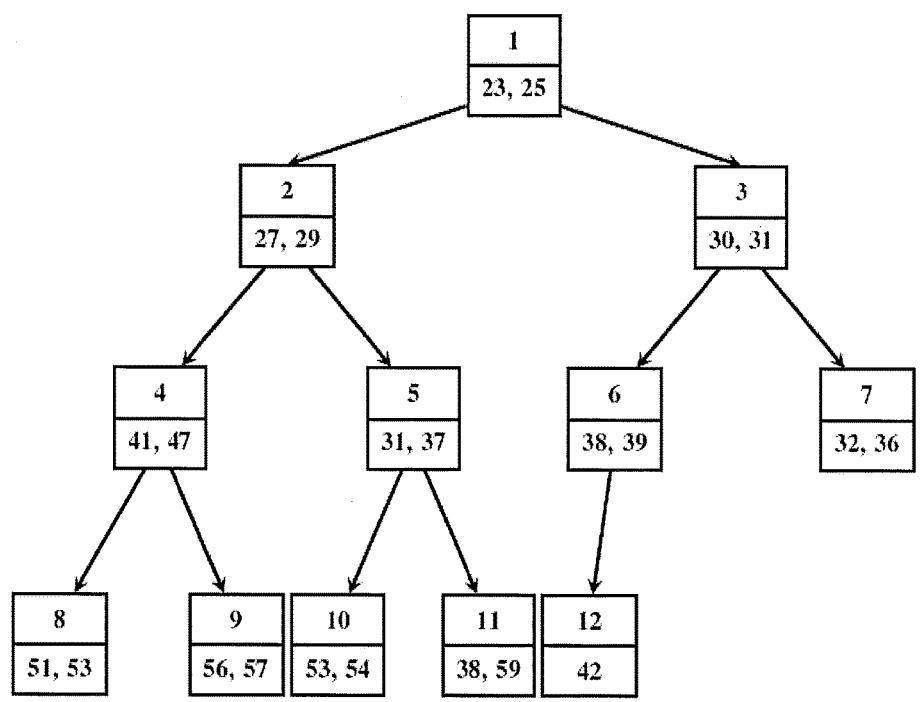

Referring next to FIGS. 4A-C, shown are diagrams 403a-c illustrating example operations of a parallel heap implemented as portions of the priority queue application 109 (FIG. 1) executed in a computing environment in the computing environment of FIG. 1 according to various embodiments of the present disclosure. The non-limiting example of FIG. 4 illustrates a delete- and insert-operation of an exemplary parallel heap. In FIG. 4, four keys 406a, 406b, 406c, and 406d (i.e., keys 9, 27, 31, and 38) enter a four-level parallel heap 409a with a heap node capacity of r=2. The four keys 406a-d are merged with two keys 412 (i.e., 18 and 23), at a root node 415a in the buffer. The smallest two keys in the buffer (i.e., 9 and 18) are deleted and transferred to the priority queue application 109. The next smallest two keys (i.e., 23 and 27) are placed at the root node 415a and a delete-update process is initiated to maintain the destroyed heap property.

As shown in FIG. 4B, the remaining keys (i.e., 31 and 38) are to be inserted into the parallel heap through two insert-update processes 418a-b along the two insertion paths. The delete-update process first restores the heap property at the root node by merging and replacing the keys at the root node 415b, the second node 421, and the third node 424. After placing the largest keys (i.e., 31 and 32) in the third node 424, the heap property at the third node 424 is destroyed and the delete-update process proceeds to process the third node 424, the sixth node 427, and the seventh node 430. Afterwards, the delete-update process is complete as there are no children for the sixth node 427 and the seventh node 430.

The first insert-update process proceeds by merging with keys at the root node 415b, the second node 421, and the fifth node 433 as well as carrying the largest keys down for each iteration. When the insert-update process is complete, the last key (i.e., 38) is inserted into the eleventh node 436. Similarly, the second insert-update process works with the root node 415b, the third node 424, and the sixth node 427. The key 42, in the seventh node 430, eventually proceeds to the twelfth node 12.

In FIG. 4C, the diagram 403c depicts the parallel heap after the delete-update and insert-update operations. Note that the delete-update process only has one even-level and one odd-level merging, so it may be accomplished in a single delete-insert cycle. The two insert-update processes have two even-level and one odd-level merging processes, so it may be accomplished in two consecutive delete-insert cycles.

Figure 5:
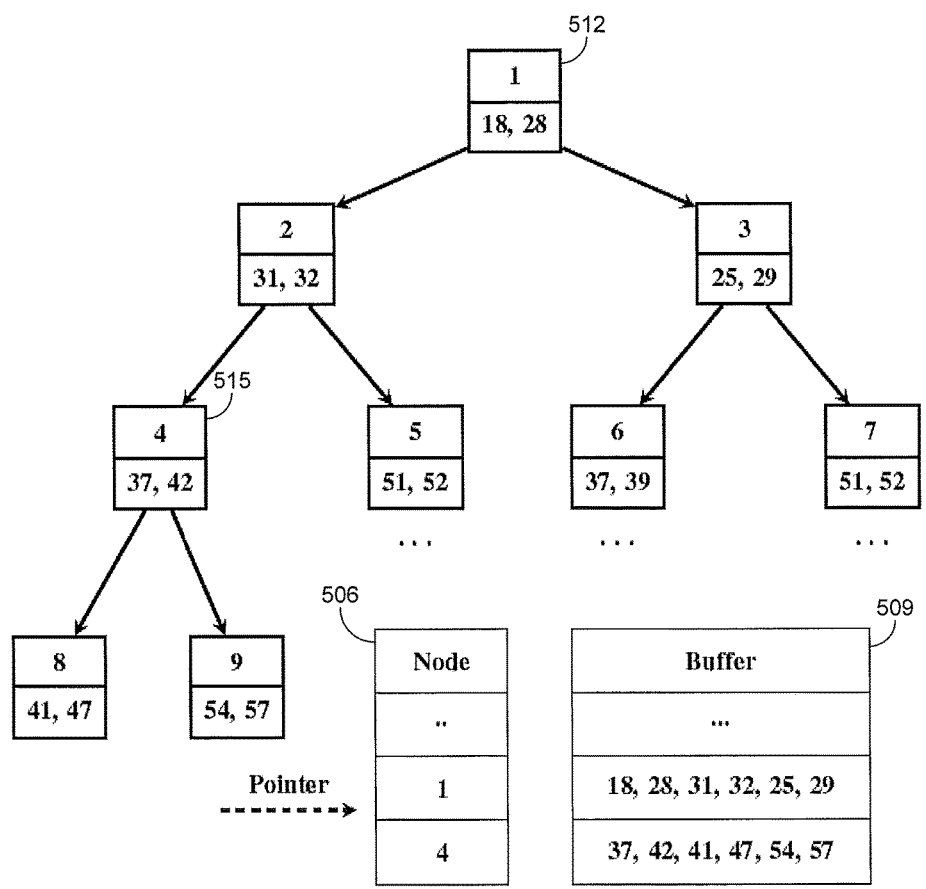

With respect to FIG. 5, shown is a diagram 503 illustrating example operations of a parallel heap implemented as portions of the priority queue application 109 (FIG. 1) executed in a computing environment in the computing environment of FIG. 1 according to various embodiments of the present disclosure. As discussed above, on every two adjacent levels of the parallel heap, normally one delete-update and up to two insert-update processes exist. Two data structures may be designed to facilitate the concurrent execution of these delete-update processes. The first data structure is referred to as a delete-table 506. The delete-table 506 may comprise, for example, a single column, wherein each row in the delete-table 506 corresponds to a single delete-update process, and stores the index of the target heap node. The second data structure may comprise a delete-buffer 506 configured to provide the working space for the delete-update process.

According to various embodiments, all of the delete-update processes may be launched in a function call, wherein each delete-update process is assigned a set of threads for execution. The delete-update processes read their respective rows in the delete-table 506 to locate a target heap node, copy the items at the target heap node and its children into the delete-buffer 509, and sort the items in the delete-buffer 509. Once complete, the items are written back to the appropriate heap nodes and the delete-table 506 is updated for the next iteration of processing.

In various embodiments, the largest r items may be kept in the delete-buffer 509 after the completion of the current processing, as these items may be reused in the next iteration, thus reducing expensive device-to-device memory copy. Accordingly, the delete-table 506 and delete-buffer 509 may be adapted to a queue structure with a pointer pointing to the starting row. In the non-limiting example of FIG. 5, two delete-update processes in the heap are employed. These processes are configured to restore the heap property at the first node 512 and the fourth node 515. The delete-buffer 509 stores the items at the first node 512 and its children, and the items at the fourth node 515 and its children, for processing, respectively.

Figure 6:
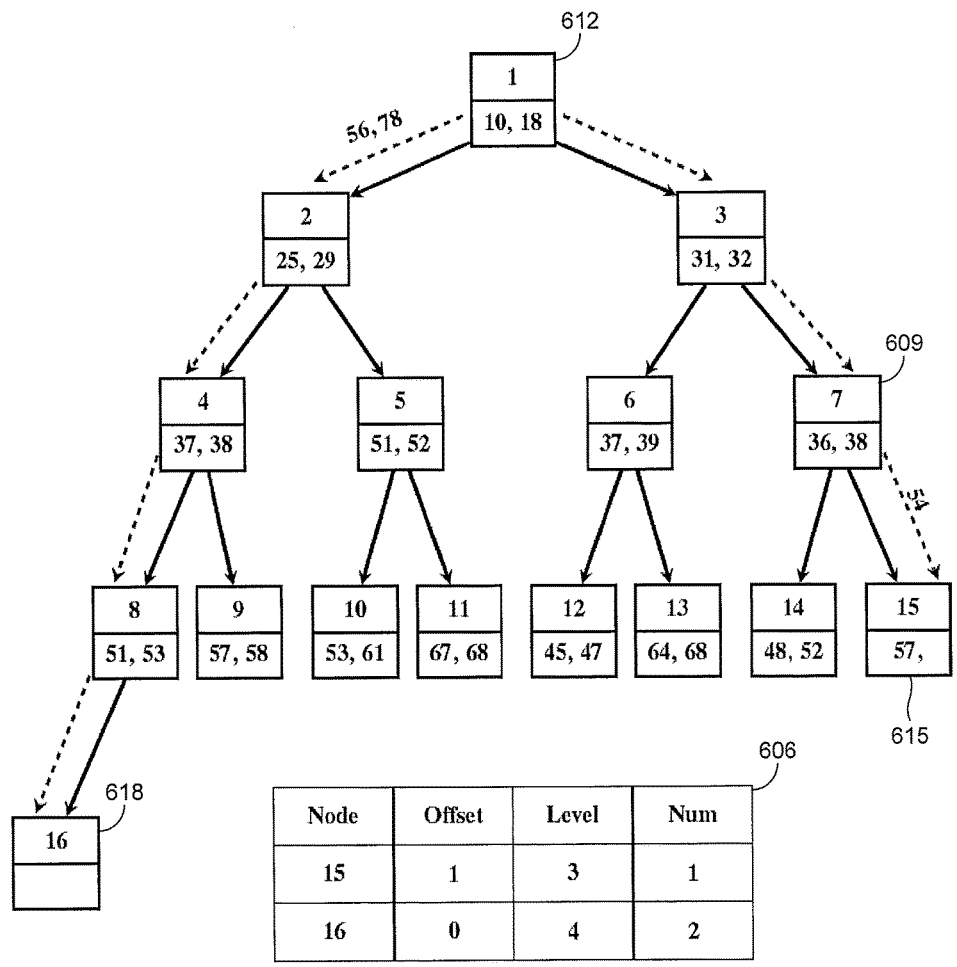

With respect to FIG. 6, shown is a diagram 603 illustrating example operations of a parallel heap implemented as portions of the priority queue application 109 (FIG. 1) executed in the computing environment of FIG. 1 according to various embodiments of the present disclosure. With respect to FIG. 6, two similar data structures, an insert-table 606 and an insert-buffer, are configured for insert-update processes. The insert-table 606 may comprise, for example, four columns representing the index of the target heap node, the offset of the next available slot in the target heap node, the level where the target heap node is located in the parallel heap, and the number of items to be inserted, respectively. The insert-update process uses this information to compute and select a target node in its insert path for current processing. Before arriving to their target nodes, the to-be-inserted items are temporarily stored in the insert-buffer, which also provides working space for merging and sorting items. In the non-limiting example of FIG. 6, two insert are processes depicted, one at the seventh node 609 and another at the first node 612. A key 54 is to be inserted into the fifteenth node 615. An insert-update process therefore merges it with the items at the seventh node 609. Likewise, two keys 56 and 78, currently at the first node 612, are headed to the sixteenth node 618. The insert-update process merges them with the items at the first node 612.

When dealing with the situation in which there are not enough new items for deletions, a kernel function is invoked to search for the to-be-inserted items in the insert-buffer. A number of r−k to-be-inserted items are deleted from the insert-buffer and corresponding insert-update processes are cancelled if there are more than r−k items in the insert-buffer. Otherwise, the items from both the insert-buffer and the end of the heap may be taken. When this kernel is invoked by the CPU based controller, it does not have to contend with any other pipelined processes.

Figure 7:
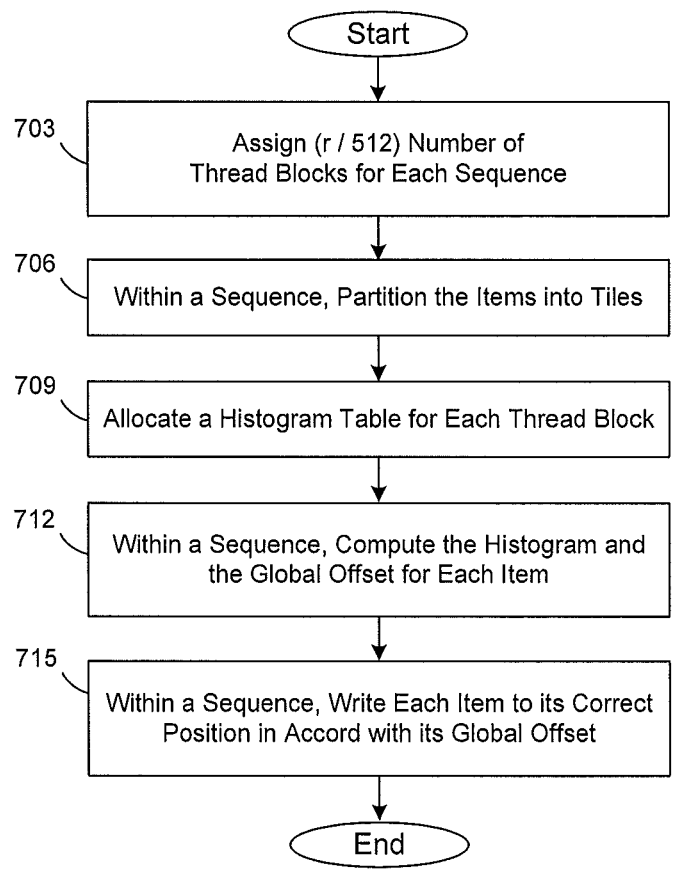
FIG. 7 is a flowchart illustrating one example of functionality implemented as portions of the priority queue application executed in the computing environment of FIG. 1 according to various embodiments of the present disclosure.

Referring next to FIG. 7, shown is a flowchart that provides one example of a sorting operation of a portion of the priority queue application 109 (FIG. 1) according to various embodiments. It is understood that the flowchart of FIG. 7 provides merely an example of the many different types of functional arrangements that may be employed to implement the operation of the portion of the priority queue application 109 as described herein. As an alternative, the flowchart of FIG. 7 may be viewed as depicting an example of elements of a method implemented in the computing environment 100 (FIG. 1) according to one or more embodiments.

According to various embodiments, instead of merging items needed in both the delete-update and insert-update processes, items may be sorted as opposed to being merged (for delete-update processes, two merge operations are required) considering inefficiency of the implementation of the merge operation on GPGPUs and the less work required for adapting a sorting routine. As a non-limiting example, a sorting routine may comprise a radix sort implementation.

However, a modification may be made over the original sorting routine to enable concurrent sorting thus making full use of the computing resources of a GPGPU. In 703, a modified radix sorting implementation may comprise allocating r=512 thread blocks for each sequence of items to be sorted. The functionality may be broken down into multiple kernel functions. The sorting may be partitioned into passes, wherein, in each pass, items within a sequence are sorted based on a radix-4 digit for an item. A synchronization may be required between passes. In 706, within a sequence, the items are partitioned into tiles. Each thread block loads its tile onto the shared memory and sorts the tile. In 709, a histogram table is allocated for each thread block. Within a sequence, the histogram and the global offset for each item is determined and allocation, in 712. In 715, within a sequence, each item may be written to its correct position in accord with its global offset.

Figure 8:
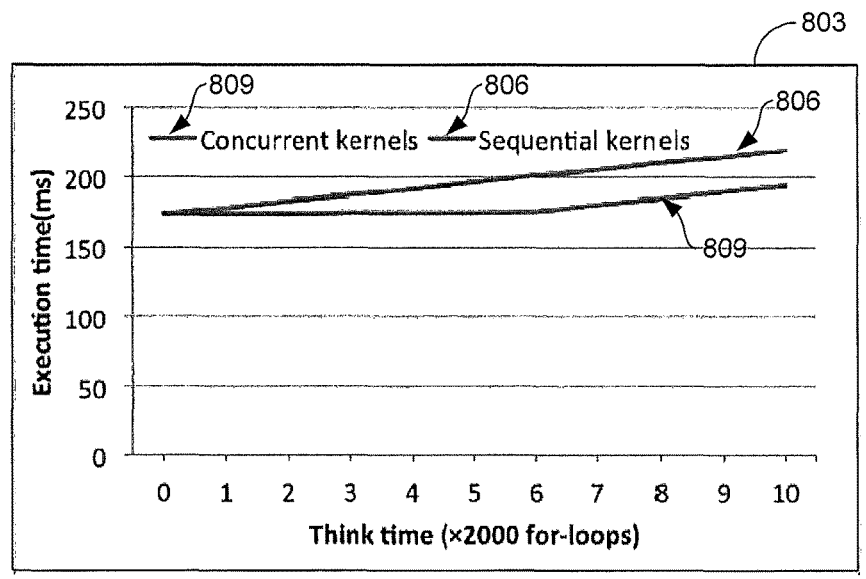
FIG. 8 is a chart illustrating an effect of concurrent kernels versus sequential kernels according to an embodiment of the priority queue application executed in a computing environment in the computing environment of FIG. 1 according to various embodiments of the present disclosure.

Moving on to FIG. 8, shown is a chart 803 illustrating an effect of concurrent kernels versus sequential kernels according to an embodiment of the priority queue application executed in a computing environment in the computing environment of FIG. 1 according to various embodiments of the present disclosure. The performance of the parallel heap system (Parallel Priority Queue or PPQ) on CUDA may be tested with varying think times and sizes of heap nodes. It may be further compared with a sequential binary heap system (SeqHeap) and a multi-core implementation of PPQ. In the non-limiting example of FIG. 8, the effect of concurrent kernels versus sequential kernels was measured with $s=2^{14}$; $n=2^{17}$; and $r=2^8$, wherein r represents a size of a heap node, n represents a number of initial items in the heap, t represents a think time (as discussed below), and s represents a total number of inserted or deleted items through an entire experiment over all delete-think-insert cycles.

FIG. 8 shows the performance comparison of a parallel heap system implemented with sequential kernels and concurrent streaming kernels, wherein the former corresponds to the application being executed after parallel heap maintenance kernels, while the latter executes two sets of kernels simultaneously in different streams. The first line 806 is used to represent a parallel heap system implemented with sequential kernels. As shown in FIG. 8, the increase of an execution time is proportional to the increasing duration of the think time while other conditions remain unchanged. On the other hand, the second line 809, representing a parallel heap system implemented with concurrent kernels, is observed to stay stable when dealing with a fine-grained application (t<12000). The execution of the application is tolerated by the maintenance work of the parallel heap. However, as the grain of the application becomes coarser, the performance of the system is dominated by the performance of the application, and as a result the duration of the think time becomes significant for the performance of the system (beyond t>12000). Therefore, it is beneficial to report data employing concurrent kernels.

Figure 9:
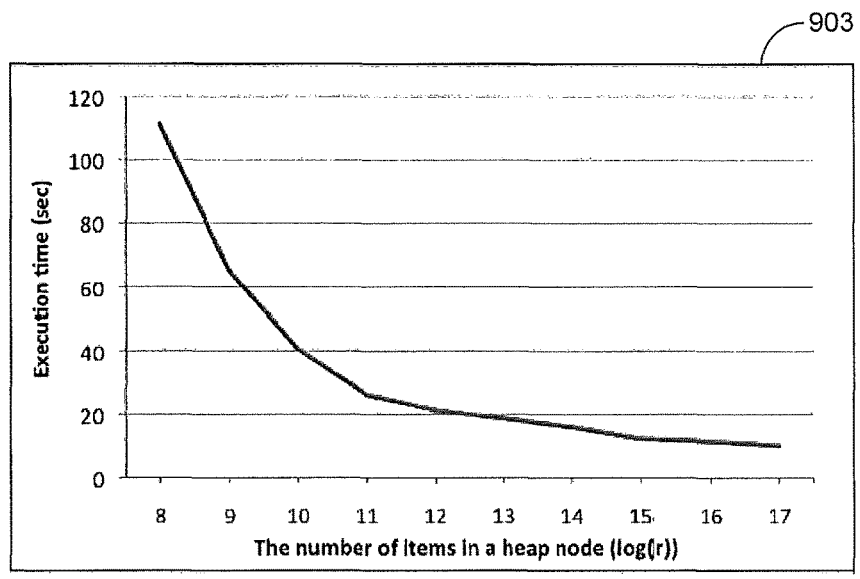
FIG. 9 is a chart illustrating execution times versus varying sizes of heap nodes according to an embodiment of the priority queue application executed in a computing environment in the computing environment of FIG. 1 according to various embodiments of the present disclosure.

Referring next to FIG. 9, shown is a chart 903 illustrating execution times versus varying sizes of heap nodes according to an embodiment of the priority queue application executed in a computing environment in the computing environment of FIG. 1 according to various embodiments of the present disclosure. In the non-limiting example of FIG. 9, the varying size of heap nodes is measured wherein t=6000; $s=2^{22}$; and $n=2^{26}$.

FIG. 9 depicts a performance of a parallel heap with varying sizes of heap nodes. It can be observed that as the more items a heap node contains the better performance the system may achieve. To insert or delete a same amount of items, the number of the required delete-insert cycles may be reduced if a heap node is able to contain more items. Thus, more items may be updated in a single update process. On the other hand, a latency toleration mechanism in GPGPUs requires that enough threads exist in GPGPUs so that expensive global memory reads/writes may be tolerated. In other words, a wait for global memory reads/writes can keep processors in GPGPUs idle if not enough live threads can be scheduled to run, and in that case, launching more threads in GPGPUs may facilitate utilizing these idle processes without much additional overhead. Consequently, the increment of the number of items to be updated in a single update operation does not cause proportional increase in an execution time of an update operation and the overall system performance may be enhanced with fewer delete-insert cycles.

Accordingly, a wide heap node in the parallel heap can also be justified. With additional computing resources, a very large complex heap-based application may be executed that can exhibit increasingly larger amount of concurrency. In the CUDA parallel heap system described in the present disclosure, more "work" is pushed to the GPGPUs to make full use of the GPGPUs. As the size of the heap node increases, the heap maintenance and the application kernels receive more work to perform and hence the overall performance of the system improves.

Figure 10:
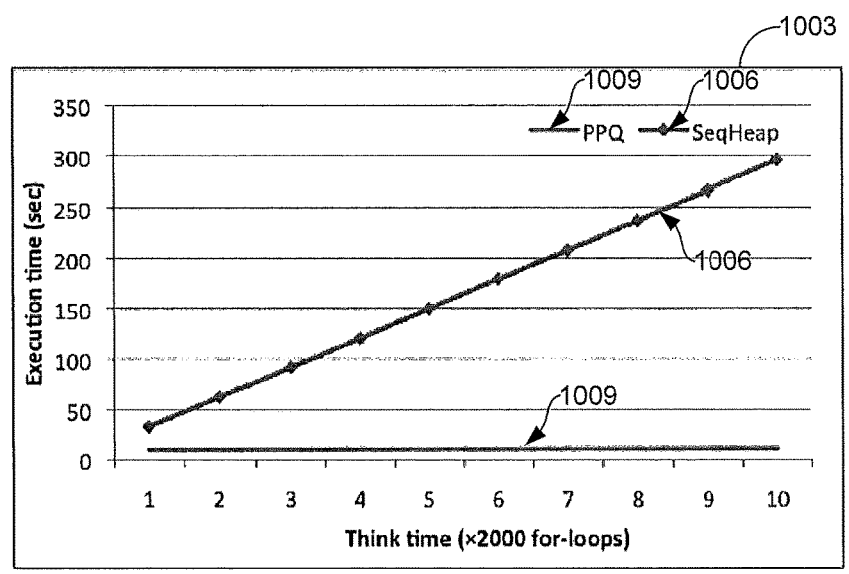
FIG. 10 is a chart illustrating execution times versus "think" times according to an embodiment of the priority queue application executed in a computing environment in the computing environment of FIG. 1 according to various embodiments of the present disclosure.

Turning now to FIG. 10, shown is a chart 1003 illustrating execution times versus "think" times for a parallel heap on CUDA architecture and a sequential heap according to an embodiment of the priority queue application executed in a computing environment in the computing environment of FIG. 1 according to various embodiments of the present disclosure. With respect to FIG. 10, a sequential binary heap system (SeqHeap) on notably faster CPU multi-cores was implemented for comparison. This system is more efficient than a conventional binary heap system as it can combine a pair of consecutive insert and delete operations into one insert-delete operation. The first line 1006 depicts that a duration of think time is significant with respect to a performance of a sequential heap. The second line 1009 represents a PPQ performance under varying loads of different fine-to-medium grained applications. As shown in FIG. 10, the performance of the system remains stable with different compute grains. As described above with respect to FIG. 8, due to the concurrent kernel techniques employed, the execution of fine-grained applications is well tolerated by maintenance work of a parallel heap. Performance of the system is not sensitive to the duration of the think time for such compute loads. Moreover, as shown in FIG. 10, with a large enough size of the heap nodes and more maintenance work, even the execution of medium-grained applications may be tolerated.

Figure 11:
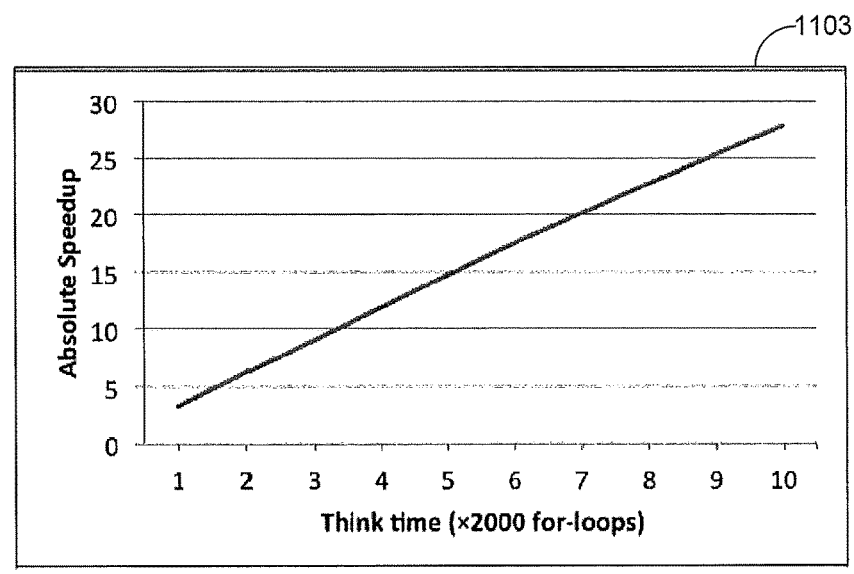
FIG. 11 is a chart illustrating absolute speedups of a parallel heap with varying "think" times according to an embodiment of the priority queue application executed in a computing environment in the computing environment of FIG. 1 according to various embodiments of the present disclosure.

Moving on to FIG. 11, shown is a chart 1103 illustrating absolute speedups of a parallel heap with varying "think" times according to an embodiment of the priority queue application executed in a computing environment in the computing environment of FIG. 1 according to various embodiments of the present disclosure. Specifically, FIG. 11 illustrates that a duration of think time is significant with respect to an absolute speedup. As discussed above, an execution time of a SeqHeap increases with an increasing duration of the think time while the execution time of PPQ does not. Hence more speedup is achieved as the duration of the think time increases.

Figure 12:
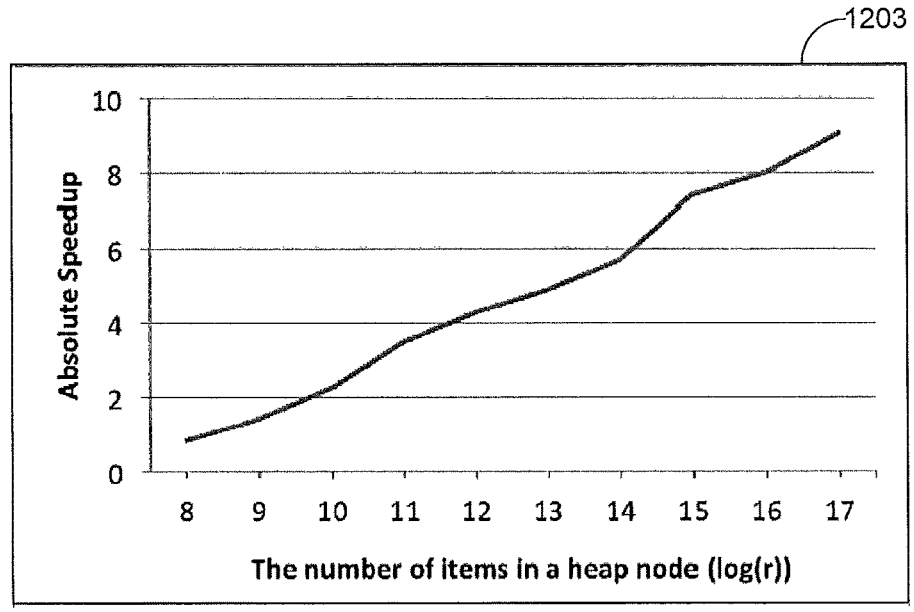
FIG. 12 is a chart illustrating absolute speedups of a parallel heap with varying sizes of heap nodes according to an embodiment of the priority queue application executed in a computing environment in the computing environment of FIG. 1 according to various embodiments of the present disclosure.

In FIG. 12, shown is a chart 1203 illustrating absolute speedups of a parallel heap with varying sizes of heap nodes according to an embodiment of the priority queue application executed in a computing environment in the computing environment of FIG. 1 according to various embodiments of the present disclosure. FIG. 12 illustrates that an absolute speedup can achieve rises with an increasing size of the parallel heap node because a wider heap node may enhance the performance of PPQ while SeqHeap nodes may contain only one item.

Figure 13:
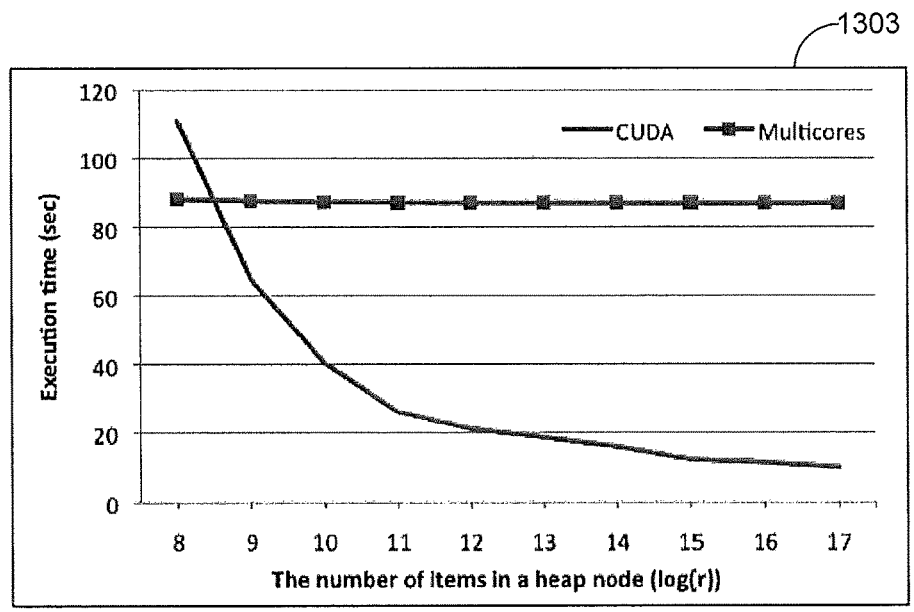
FIG. 13 is a chart illustrating a performance comparison with a multi-core-based parallel heap implementation with varying node sizes according to an embodiment of the priority queue application executed in a computing environment in the computing environment of FIG. 1 according to various embodiments of the present disclosure.

Turning now to FIG. 13, shown is a chart 1303 illustrating a performance comparison with a multi-core-based parallel heap implementation with varying node sizes according to an embodiment of the priority queue application executed in a computing environment in the computing environment of FIG. 1 according to various embodiments of the present disclosure. A performance difference of GPGPUs based and multicores based implementations over varying node sizes is displayed in FIG. 13. The multicore thread-based implementation of a parallel heap is based on bus-based shared memory implementation, and may achieve better performance for medium grained applications. Due to a hardware restriction, a number of available processors may be limited. Therefore, only one processor is assigned to deal with the delete or insert operation for one level of the parallel heap.

Figure 14:
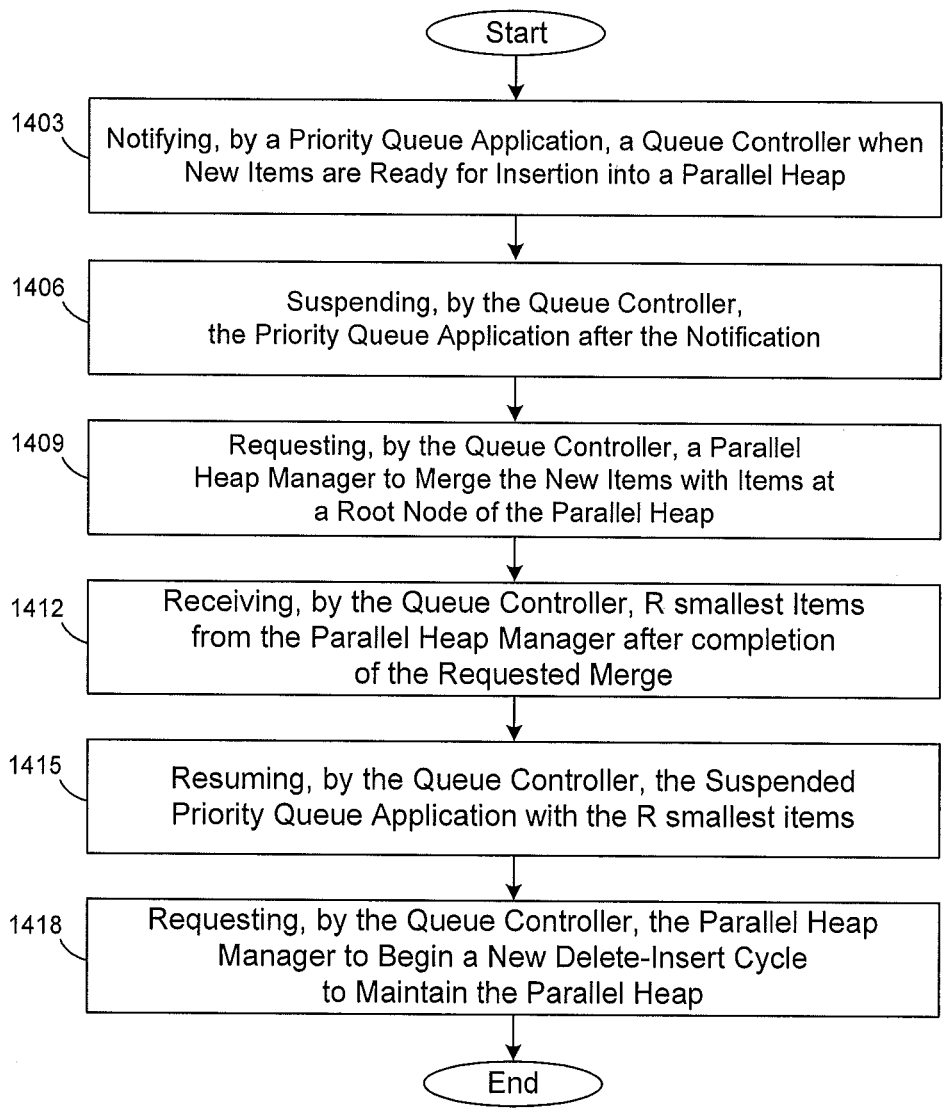
FIG. 14 is a flowchart illustrating one example of functionality implemented as portions of the priority queue application executed in the computing environment of FIG. 1 according to various embodiments of the present disclosure.

Referring next to FIG. 14, shown is a flowchart that provides one example of operation of a portion of the priority queue application 109 (FIG. 1) according to various embodiments. It is understood that the flowchart of FIG. 14 provides merely an example of the many different types of functional arrangements that may be employed to implement the operation of the portion of the priority queue application 109 as described herein. As an alternative, the flowchart of FIG. 14 may be viewed as depicting an example of elements of a method implemented in the computing environment 100 (FIG. 1) according to one or more embodiments.

In 1403, a priority queue application 109 may be configured to notify a controller 103 when one or more new items are ready for insertion into a parallel heap. In 1406, the controller 103 may suspend the priority queue application 109 after the notification. In 1409, the controller 103 may be configured to request a parallel heap manager 106 to merge the one or new items with items at a root node of the parallel heap. In 1412, the controller 103 may be configured to receive a plurality of r smallest items from the parallel heap manager 106 after the parallel heap manager 106 has completed the requested merge. Next, in 1415, the controller 103 may be configured to resume the suspended priority queue application with the plurality of r smallest items. In 1418, the controller 103 may request the parallel heap manager 106 to begin a new delete-insert cycle to maintain the parallel heap. According to various embodiments, the resuming and the requesting of the new delete-insert cycle are performed concurrently.

Figure 15:
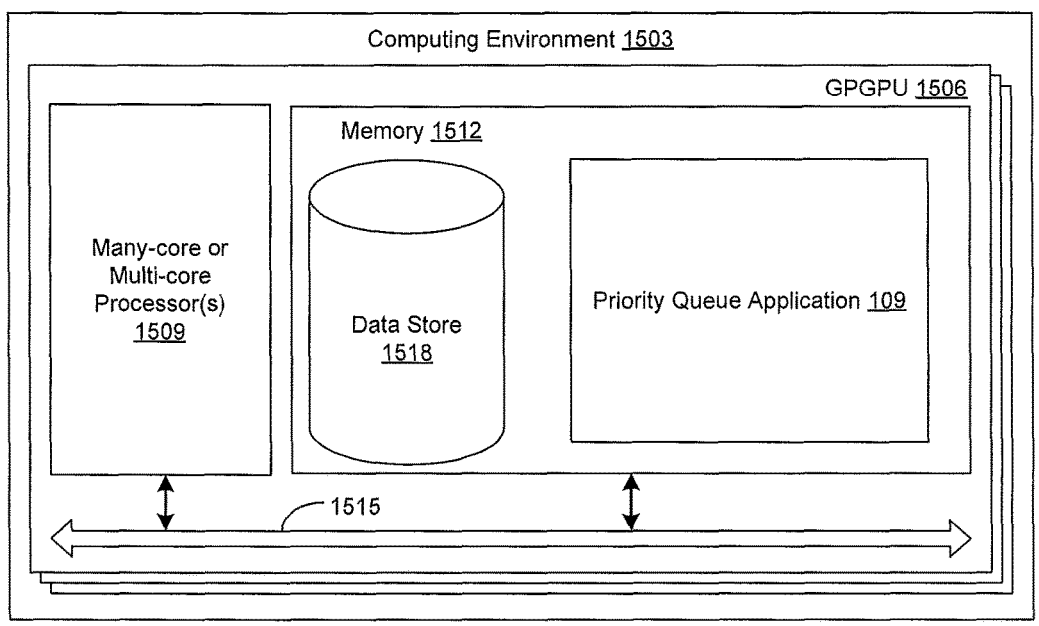
FIG. 15 is a schematic block diagram that provides one example illustration of the computing environment of FIG. 1 according to various embodiments of the present disclosure.

With reference to FIG. 15, shown is a schematic block diagram of a computing environment 1503 according to an embodiment of the present disclosure. The computing environment 1503 includes one or more GPUs or GPGPUs 1506. Each GPGPU 1506 includes at least one processor circuit, for example, having one or more processors 1509, such as a many-core and/or multi-core processors, and a memory 1512, both of which are coupled to a local interface 1515. Although described with respect to a GPGPU 1506, the present disclosure may be embodied in a server computer or like device. The local interface 1515 may comprise, for example, a data bus with an accompanying address/control bus or other bus structure as can be appreciated.

The present disclosure describes an implementation of a fundamental parallel priority queue data-structure on a plurality of GPGPUs (General Purpose Graphics Processing Units), or similar devices, that enables an entire class of non-numerical irregular priority-queue-based parallel applications, such as discrete event simulation, branch-and-bound, and other state space search algorithms to be ported to and executed on GPGPUs. According to various embodiments, the present disclosure may extend to (i) multiple GPGPUs per central processing unit (CPU) as well as heterogeneous clusters of such CPU-GPGPUs pairs, with message-based programs such as message passing interface (MPI) coordinating across a plurality of compute node; and (ii) client-server, accelerator-based, and/or shared memory programming on CPU-GPGPU pairs, such as using open multi-processing (openMP)/PTHREADS on multi-core CPU(s) as well as CUDA/OpenCL/OpenACC on many-core GPGPUs, although the present disclosure is not limited to these programming environments.

Stored in the memory 1512 are both data and several components that are executable by the processor 1509. In particular, stored in the memory 1512 and executable by the processor 1509 are the priority queue application 109, and potentially other applications. Also stored in the memory 1512 may be a data store 1518 and other data. In addition, an operating system may be stored in the memory 1512 and executable by the processor 1509.

It is understood that there may be other applications that are stored in the memory 1512 and are executable by the processor 1509 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1512 and are executable by the processor 1509. In this respect, the term "executable" means a program file that is in a form that can ultimately be run by the processor 1509. Examples of executable programs may be, for example, a compiled program that can be translated into machine code in a format that can be loaded into a random access portion of the memory 1512 and run by the processor 1509, source code that may be expressed in proper format such as object code that is capable of being loaded into a random access portion of the memory 1512 and executed by the processor 1509, or source code that may be interpreted by another executable program to generate instructions in a random access portion of the memory 1512 to be executed by the processor 1509, etc. An executable program may be stored in any portion or component of the memory 1512 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1512 is defined herein as including both volatile and nonvolatile memory and data storage components. Volatile components are those that do not retain data values upon loss of power. Nonvolatile components are those that retain data upon a loss of power. Thus, the memory 1512 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1509 may represent multiple processors 1509 and/or multiple processor cores and the memory 1512 may represent multiple memories 1512 that operate in parallel processing circuits, respectively. In such a case, the local interface 1515 may be an appropriate network that facilitates communication between any two of the multiple processors 1509, between any processor 1509 and any of the memories 1512, or between any two of the memories 1512, etc. The local interface 1515 may comprise additional systems designed to coordinate this communication, including, for example, performing load balancing. The processor 1509 may be of electrical or of some other available construction.

Although the priority queue application 109, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7 and 14 show the functionality and operation of an implementation of portions of the priority queue application 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1509 in a computer system or other system. The machine code may be converted from the source code, etc. If embodied in hardware, each block may represent a circuit or a number of interconnected circuits to implement the specified logical function(s).

Although the flowcharts of FIGS. 7 and 14 show a specific order of execution, it is understood that the order of execution may differ from that which is depicted. For example, the order of execution of two or more blocks may be scrambled relative to the order shown. Also, two or more blocks shown in succession in FIGS. 7 and 14 may be executed concurrently or with partial concurrence. Further, in some embodiments, one or more of the blocks shown in FIGS. 7 and 14 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the priority queue application 109, that comprises software or code can be embodied in any non-transitory computer-readable medium for use by or in connection with an instruction execution system such as, for example, a processor 1509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the priority queue application 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same GPGPU 1506, or in multiple computing devices in the same computing environment 1503. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a host processor comprising a central processing unit (CPU);
   a graphics processing unit (GPU) comprising a many-core architecture;
   kernel code executable by the GPU that, when executed by the GPU, causes the GPU to:
   execute a parallel heap manager and a priority queue application concurrently in the GPU by assigning at least one kernel function of the parallel heap manager to a first stream and at least one kernel function of the priority queue application to a second stream;

implement, by the priority queue application in the first stream, a priority queue as a parallel heap where a plurality of operations performed on the priority queue are performed in parallel on the GPU; and maintain, by the parallel heap manager in the second stream, an order of priority as a plurality of queue entries are inserted and deleted from the priority queue; and host code executable by the host processor that, when executed, causes the host processor to:

synchronize, by a controller implemented by the host processor, operations of the priority queue application and the parallel heap manager using a global barrier.

2. The system of claim 1, wherein the GPU further comprises a plurality of streaming multiprocessors (SPs) employed in a single instruction multiple thread (SIMT) architecture.

3. The system of claim 2, wherein the parallel heap further comprises a plurality of parallel heaps, wherein each of the parallel heaps corresponds to one of the plurality of SPs for processing.

4. The system of claim 1, wherein the kernel code and the host code are implemented in a compute unified device architecture (CUDA).

5. The system of claim 1, wherein the GPU further comprises a general computing graphics processing unit (GCGPU) comprising the many-core architecture.

6. The system of claim 1, wherein the priority is determined for each of the plurality of queue entries according to a time stamp for each of the plurality of queue entries.

7. The system of claim 1, wherein the GPU further comprises a plurality of streaming multi processors (SPs) employed in a single instruction multiple thread (SIMT) architecture.

8. The system of claim 1, wherein the plurality of operations synchronized include an insert operation and a delete operation.

9. The system of claim 1, further comprising:

kernel code executable by the GPU that, when executed, causes the GPU to notify, by the priority queue application, the controller when one or more new items are ready for insertion into the parallel heap; and host code executable by the CPU that, when executed, causes the CPU to:

suspend, by the controller, the priority queue application after the notification;

request, by the controller, the parallel heap manager executed in the GPU to merge the one or new items with items at a root node of the parallel heap;

receive, by the controller, a plurality of R smallest items from the parallel heap manager after the parallel heap manager has completed the requested merge;

resume, by the controller, the suspended priority queue application with the plurality of R smallest items; and request, by the controller, the parallel heap manager to begin a new delete-insert cycle to maintain the parallel heap.

10. The system of claim 9, wherein resuming and the requesting of the new delete-insert cycle are performed concurrently.

11. The system of claim 1, wherein the at least one kernel function of the parallel heap manager assigned to the first stream and the at least one kernel function of the priority queue application assigned to the second stream are executed in a first-in-first-out (FIFO) manner.

12. A method, comprising:

implementing, by a graphics processing unit (GPU) comprising a plurality of streaming multi-core processors, a parallel heap manager and a priority queue application concurrently in the GPU, wherein at least one kernel function of the parallel heap manager is assigned to a first stream and at least one kernel function of the priority queue application is assigned to a second stream;

implementing, by the priority queue application in the first stream, a priority queue as a parallel heap where a plurality of operations performed on the priority queue are performed in parallel;

providing, by a host processor comprising a central processing unit (CPU) in communication with the GPU, a programmatic interface for retrieving, inserting, and deleting a plurality of queue entries in the parallel heap;

maintaining, by a controller executed in the host processor, a priority order as the plurality of queue entries are inserted and deleted from the priority queue; and synchronizing, by the controlled executed in the host processor, a plurality of operations performed by the parallel heap manager and the priority queue application on the parallel heap of the GPU using a global barrier.

13. The method of claim 12, wherein each of the plurality of streaming multi-core processors employs a single instruction multiple thread (SIMT) architecture.

14. The method of claim 12, wherein the priority queue and the parallel heap are further synchronized using kernel synchronization.

15. The method of claim 12, wherein the plurality of operations synchronized include an insert operation and a delete operation.

16. The method of claim 12, further comprising:

notifying, by the priority queue application executed in the GPU, the controller when one or more new items are ready for insertion into the parallel heap;

suspending, by the controller executed in the CPU, the priority queue application after the notification;

requesting, by the controller executed in the CPU, the parallel heap manager executed in the GPU to merge the one or new items with items at a root node of the parallel heap;

receiving, by the controller executed in the CPU, a plurality of R smallest items from the parallel heap manager after the parallel heap manager has completed the requested merge;

resuming, by the controller executed in the CPU, the suspended priority queue application with the plurality of R smallest items; and requesting, by the controller executed in the CPU, the parallel heap manager to begin a new delete-insert cycle to maintain the parallel heap.

17. The method of claim 16, wherein the resuming and the requesting of the new delete-insert cycle are performed concurrently.

18. The method of claim 16, wherein the parallel heap further comprises a plurality of parallel heaps, wherein each of the parallel heaps corresponds to one of the plurality of SPs for processing.

19. The method of claim 16, wherein the GPU further comprises a general computing graphics processing unit (GCGPU) comprising a many-core architecture.

20. The method of claim 12, wherein the at least one kernel function of the parallel heap manager assigned to the first stream and the at least one kernel function of the priority queue application assigned to the second stream are executed in a first-in-first-out (FIFO) manner.

* * * * *